(12) United States Patent
Konno et al.

(10) Patent No.: US 6,740,704 B2
(45) Date of Patent: May 25, 2004

(54) METHODS FOR PRODUCING DIENE-BASED RUBBER/INORGANIC COMPOUND COMPLEXES AND RUBBER COMPOSITIONS CONTAINING THE SAME

(75) Inventors: Tomohisa Konno, Tokyo (JP); Yoshiyuki Udagawa, Tokyo (JP); Toshihiro Tadaki, Tokyo (JP)

(73) Assignee: JSR Corporation, Tokyo (JP)

( * ) Notice: Subject to any disclaimer, the term of this patent is extended or adjusted under 35 U.S.C. 154(b) by 161 days.

(21) Appl. No.: 10/011,739

(22) Filed: Dec. 11, 2001

(65) Prior Publication Data

US 2002/0111418 A1 Aug. 15, 2002

(30) Foreign Application Priority Data

Dec. 12, 2000 (JP) ........................................ 2000-377871
Jul. 4, 2001 (JP) ........................................ 2001-203925

(51) Int. Cl.$^7$ ................................................ C08L 9/00
(52) U.S. Cl. ........................ 524/572; 524/432; 524/492; 524/571
(58) Field of Search ................................ 524/572, 571, 524/492, 432

(56) References Cited

U.S. PATENT DOCUMENTS

| | | | |
|---|---|---|---|
| 2,485,287 A | | 10/1949 | Henson et al. .................. 260/41 |
| 2,964,490 A | | 12/1960 | Howland et al. ........... 260/41.5 |
| 3,392,140 A | | 7/1968 | Maahs et al. ............... 260/41.5 |
| 3,895,035 A | * | 7/1975 | Berg et al. .................... 524/432 |
| 3,998,778 A | * | 12/1976 | Berg et al. .................... 524/552 |
| 6,025,415 A | * | 2/2000 | Scholl .......................... 523/213 |
| 6,559,219 B2 | | 5/2003 | Tadaki et al. ................ 524/495 |
| 6,562,929 B2 | | 5/2003 | Konno et al. ................ 526/338 |

FOREIGN PATENT DOCUMENTS

| | | |
|---|---|---|
| EP | 0 989 155 | 3/2000 |
| JP | 59-49247 | 3/1984 |
| JP | 9-208623 | 8/1997 |
| JP | 9-208633 | 8/1997 |
| WO | WO 96/23027 | 8/1996 |

OTHER PUBLICATIONS

U.S. patent application Ser. No. 09/842,162, Konno et al., filed Apr. 26, 2001.
U.S. patent application Ser. No. 09/843,864, Konno et al., filed Apr. 30, 2001.
U.S. patent application Ser. No. 09/940,895, Konno et al., filed Aug. 29, 2001.
U.S. patent application Ser. No. 10/011,739, Konno et al., filed Dec. 11, 2001.
U.S. patent application Ser. No. 10/069,665, Akema et al., filed Feb. 28, 2002.

* cited by examiner

*Primary Examiner*—David W. Wu
*Assistant Examiner*—Henry S. Hu
(74) *Attorney, Agent, or Firm*—Oblon, Spivak, McClelland, Maier & Neustadt, P.C.

(57) ABSTRACT

The object of the present invention is to provide a method for producing a diene-based rubber/inorganic compound complex capable of allowing a silicic acid compound including silica and the like to be dispersed uniformly and allowing a reinforcing effect to be exerted sufficiently, and a rubber composition containing said complex. A latex comprising a diene-based rubber such as styrene-butadiene copolymeric rubber, butadiene-styrene-isoprene copolymeric rubber and the like is mixed with an aqueous solution of a silicate in which an alkaline salt of silicic acid such as sodium silicate, potassium silicate and the like is dissolved, and then the resultant mixture is further mixed with an aqueous solution of electrolytes containing [1] a cationic substance which has an affinity to the diene-based rubber including a cationic polymer coagulating agent such as poly(meth)acrylic ester or the like and a cationic surfactant such as alkylamine acetate or the like and [2] a salt of an acid such as hydrochloric acid, nitric acid and the like with a multivalent metal such as calcium, magnesium and the like, to form a co-coagulated material, which is followed by a drying, whereby obtaining a diene-based rubber/inorganic compound complex.

13 Claims, No Drawings

METHODS FOR PRODUCING DIENE-BASED RUBBER/INORGANIC COMPOUND COMPLEXES AND RUBBER COMPOSITIONS CONTAINING THE SAME

BACKGROUND OF THE INVENTION

1. Field of the Invention

The invention relates to a method for producing a diene-based rubber/inorganic compound complex in which a silicic acid compound particle is dispersed uniformly in the diene-based rubber and which exerts a sufficient reinforcing effect, and a rubber composition containing this complex as an essential component. More particularly, the invention relates to a method for producing an improved diene-based rubber/inorganic compound complex for the purpose of generating a silica particle and the like in a diene-based rubber latex and dispersing the particle uniformly in the diene-based rubber, and a rubber composition containing the same. Now that the term "silicic acid compound" means a substance including silica or the like and it is hereinafter often expressed as "silicic acid compound including silica and the like". A rubber composition of the invention can be converted into a vulcanized rubber which is excellent in terms of physical characteristics such as wearing resistance, and thus is useful especially as a tire rubber such as a tire tread as well as a rubber material for any of various rubber products such as belts, rubber rolls and hoses.

2. Description of the Related Art

In response to a recent demand for high gas mileage of automobile, rubber material such as a conjugated diene-based rubber capable of giving a rubber composition for a tire which has low rolling resistance, excellent destruction characteristics and wearing resistance, high wet skid resistance, a representative index of a driving stability, is desired.

Tire rolling resistance can be reduced by lowering hysteresis loss of vulcanized rubber. The hysteresis loss can be evaluated based on various physical properties. For example, compositions preferably have high impact resilience at 50 to 80° C., a low tanδ at 50 to 80° C. or low Goodrich heat release. Compositions including natural rubber, isoprene rubber, butadiene rubber and the like show low hysteresis loss, but these are also associated with the problem of low wet skid resistance.

In recent years, there have been proposed methods of using inorganic filler such as a silica and the like to serve as reinforcing agent, or combining inorganic filler with carbon black. Tire treads employing inorganic filler or both inorganic filler and carbon black have low rolling resistance and excellent driving stability, represented by, for example, the wet skid resistance. However, vulcanized rubber exhibit a problem of poor wearing resistance, tensile strength and the like as the vulcanized rubber. One cause is believed that the affinity of inorganic filler for the conjugated diene-based rubber is lower than that of carbon black, such that a sufficient reinforcing effect cannot be achieved.

In order to increase the affinity between the silica as an inorganic filler and the conjugated diene-based rubber, it has-been attempted to use conjugated diene-based rubbers introduced therein functional group with affinity for inorganic filler. For example, there have been proposed a conjugated diene-based rubber introduced a hydroxyl group therein (WO96/23027), a conjugated diene-based rubber introduced an alkoxysilyl group therein (Japanese Patent laid-open publication No. HEI-9-208623) and a conjugated diene-based rubber introduced an alkoxysilyl group and an amino and/or a hydroxyl group therein (Japanese Patent laid-open publication No. HEI-9-208633). However, most conjugated diene-based rubbers with such an introduced functional group exhibit strong interaction with an inorganic filler when the inorganic filler is combined therewith, and this creates such problems as impaired dispersion of the inorganic filler, greater heat release during processing, poor processability and the like.

On the other hand, Japanese Patent laid-open publication No. SHO-59-49247 or the like proposed a method for simplifying a process for kneading a mixture containing carbon black as a reinforcing agent or for improving the dispersibility in a rubber. That is, the method comprises a step for incorporating carbon black into an aqueous dispersion in which a rubber such as a latex has been dispersed, a step for dispersing the formulation and coagulating, and a step for forming a carbon black master batch. While an attempt was made to prepare a silica master batch by this method, a uniform master batch was difficult to be obtained due to a difficulty in aggregating the highly hydrophilic silica which leaded to an earlier aggregation and precipitation only of a rubber component.

SUMMARY OF THE INVENTION

The present invention solves the problems associated with prior arts described above and is intended to provide a method for producing a diene-based rubber/inorganic compound complex in which a silica and the like are dispersed uniformly in a diene-based rubber, by employing an aqueous dispersion in which a rubber such as a latex has been dispersed and an aqueous solution of a silicate or an aqueous dispersion containing a silicic acid compound such as a silica and also by employing a multivalent metal salt and a particular cationic substance and enabling a promotion of a co-coagulation of a rubber component and a silicic acid compound such as a silica as well as a sufficiently-reinforced rubber composition containing the same.

The present inventors studied in detail the method for producing a diene-based rubber/inorganic compound complex in which a silica and the like are dispersed uniformly in a diene-based rubber. A rubber composition containing the diene-based rubber/inorganic compound complex showed excellent processability, and a vulcanized rubber produced by using the complex showed low rolling resistance, excellent wearing resistance, excellent tensile strength or the like.

The present invention is based one the findings described above and can be described as follows.

1. A method for producing a diene-based rubber/inorganic compound complex containing a diene-based rubber and a silicic acid compound of the first aspect of the invention is comprising:

[1] a step for mixing a diene-based rubber latex (a) and an aqueous solution of a silicate (b) to form a mixture <p>,

[2] a step for mixing the mixture <p> and an aqueous solution of electrolytes <r> containing a cationic substance (c) which has an affinity to the diene-based rubber and also a multivalent metal salt (d) to co-coagulate a diene-based rubber and a silicic acid compound whereby forming an coagulated material, and,

[3] a step for drying the coagulated material.

2. The method for producing a diene-based rubber/inorganic compound complex according to 1 above wherein said cationic substance (c) is at least one selected from the group consisting of cationic polymers and cationic surfactants.

3. The method for producing a diene-based rubber/inorganic compound complex according to 1 above wherein said diene-based rubber contained in said diene-based rubber latex (a) is a rubber having hetero atom-containing polar group.

4. The method for producing a diene-based rubber/inorganic compound complex according to 1 above wherein an extending oil for a rubber is incorporated in said diene-based rubber latex (a).

5. A method for producing a diene-based rubber/inorganic compound complex containing a diene-based rubber and a silicic acid compound of the second aspect of the invention is comprising:

[1] a step for mixing a diene-based rubber latex (a), an aqueous solution of a silicate (b) and an aqueous solution of electrolytes <r> containing a cationic substance (c) which has an affinity to the diene-based rubber and also a multivalent metal salt (d) to co-coagulate a diene-based rubber and a silicic acid compound whereby forming an coagulated material, and,

[2] a step for drying the coagulated material.

6. A method for producing a diene-based rubber/inorganic compound complex containing a diene-based rubber and a silicic acid compound of the third aspect of the invention is comprising:

[1] a step for mixing a diene-based rubber latex (a) and an aqueous solution of a silicate (b) to form a first mixture <p1>,

[2] a step for mixing the first mixture <p1> and a first aqueous solution of electrolytes <r1> containing a cationic substance (c) which has an affinity to the diene-based rubber but not containing a multivalent metal salt (d) to form a second mixture <p2>,

[3] a step for mixing the second mixture <p2> and a second aqueous solution of electrolytes <r2> containing a multivalent metal salt (d) to co-coagulate a diene-based rubber and a silicic acid compound whereby forming an coagulated material, and,

[4] a step for drying the coagulated material.

7. A method for producing a diene-based rubber/inorganic compound complex containing a diene-based rubber and a silicic acid compound of the fourth aspect of the invention is comprising:

[1] a step for forming an aqueous dispersion (b1) by generating silicic acid compound from an aqueous solution of a silicate (b),

[2] a step for mixing a diene-based rubber latex (a) and the aqueous dispersion (b1) to form a mixture <q>,

[3] a step for mixing the mixture <q> and an aqueous solution of electrolytes <r> containing a cationic substance (c) which has an affinity to the diene-based rubber and also a multivalent metal salt (d) to co-coagulate a diene-based rubber and a silicic acid compound whereby forming an coagulated material, and,

[4] a step for drying the coagulated material.

In such a manner, for the purpose of co-coagulating a rubber and a silicic acid compound including silica and the like, a mixture <p> or <p1> of a diene-based rubber latex (a) and an aqueous solution of a silicate (b), or a mixture <q> of a diene-based rubber latex (a) and an aqueous dispersion (b1) should be mixed a particular cationic substance (c) and a multivalent metal salt (d) simultaneously, or a particular cationic substance (c) followed by a multivalent metal salt (d) sequentially.

8. A rubber composition of the first aspect of the invention is containing a diene-based rubber/inorganic compound complex produced by the method comprising:

[1] a step for mixing a diene-based rubber latex (a), an aqueous solution of a silicate (b) and an aqueous solution of electrolytes containing a cationic substance (c) which has an affinity to said diene-based rubber and also a multivalent metal salt (d) to co-coagulate a diene-based rubber and a silicic acid compound whereby forming an coagulated material, and,

[2] a step for drying said coagulated material.

9. The rubber composition according to 8 above comprising at least one selected from the group consisting of a carbon black, a silica and a silane coupling agent.

10. A rubber composition of the second aspect of the invention is containing a diene-based rubber/inorganic compound complex produced by the method comprising:

[1] a step for mixing a diene-based rubber latex (a) and an aqueous solution of a silicate (b) to form a first mixture,

[2] a step for mixing said first mixture and a first aqueous solution of electrolytes containing a cationic substance (c) which has an affinity to said diene-based rubber but not containing a multivalent metal salt (d) to form a second mixture,

[3] a step for mixing said second mixture and a second aqueous solution of electrolytes containing a multivalent metal salt (d) to co-coagulate a diene-based rubber and a silicic acid compound whereby forming an coagulated material, and,

[4] a step for drying said coagulated material.

11. A rubber composition of the third aspect of the invention is containing a diene-based rubber/inorganic compound complex produced by the method comprising:

[1] a step for forming an aqueous dispersion by generating silicic acid compound from an aqueous solution of a silicate (b),

[2] a step for mixing a diene-based rubber latex (a) and said aqueous dispersion to form a mixture,

[3] a step for mixing said mixture and an aqueous solution of electrolytes containing a cationic substance (c) which has an affinity to said diene-based rubber and also a multivalent metal salt (d) to co-coagulate a diene-based rubber and a silicic acid compound whereby forming an coagulated material, and,

[4] a step for drying said coagulated material.

12. The rubber composition according to 11 above comprising a vulcanizing agent.

13. The rubber composition according to 12 above comprising at least one selected from the group consisting of a carbon black, a silica and a silane coupling agent.

According to a method of the invention, a diene-based rubber/inorganic compound complex in which a silicic acid compound such as a silica has uniformly been dispersed in the diene-based rubber can be produced, and a rubber composition containing this complex and having an excellent processability can also be obtained. In addition, this rubber composition can be improved into a rubber composition having a more satisfactory processability by incorporating a silane coupling agent and the like. Furthermore, it can be converted into a vulcanized rubber which has a low rolling resistance, is sufficiently reinforced, has an excellent wearing resistance in combination with an excellent tensile strength or the like and thus is suitable especially for a tire.

DETAILED DESCRIPTION OF THE INVENTION

The invention is further detailed below.

The "diene-based rubber" described above contained in the diene-based rubber latex is not particularly limited as long as it has a conjugated diene-based monomer unit as monomer unit constituting the rubber. And the diene-based rubber may for example be natural rubber, butadiene rubber, isoprene rubber, styrene-butadiene copolymeric rubber, butadiene-isoprene copolymeric rubber, butadiene-styrene-isoprene copolymeric rubber, acrylonitrile-butadiene copolymeric rubber, acrylonitrile-styrene-butadiene copolymeric rubber, chloroprene rubber and the like. Among those listed above, one having a conjugated diene-based monomer unit (A) and an aromatic vinyl monomer unit (B) optionally with an olefinic unsaturated nitrile monomer unit (C) is preferable, and styrene-butadiene copolymeric rubber, butadiene-styrene-isoprene copolymeric rubber and acrylonitrile-styrene-butadiene copolymeric rubber are preferred. Any of these rubbers may be used alone or in combination of two or more.

A conjugated diene-based monomer formed the conjugated diene-based monomer unit (A) may for example be 1,3-butadiene, 2,3-dimethyl-1,3-butadiene, 2-chloro-1,3-butadiene, 1,3-pentadiene, isoprene and the like. Among those listed above, 1,3-butadiene, isoprene and the like are preferred, 1,3-butadiene is more preferred. Any of these conjugated diene-based monomers may be used alone or in combination of two or more.

An aromatic vinyl monomer formed the aromatic vinyl monomer unit (B) is preferably an aromatic vinyl compound having no polar groups, such as styrene, α-methylstyrene, 2-methylstyrene, 3-methylstyrene, 4-methylstyrene, 2,4-diisopropylstyrene, 2,4-dimethylstyrene, 4-tert-butylstyrene, 5-tert-butyl-2-methylstyrene, monochlorostyrene (2-chlorostyrene, 3-chlorostyrene, 4-chlorostyrene and the like), dichlorostyrene (2,6-dichlorostyrene and the like), monofluorostyrene (2-monofluorostyrene, 3-monofluorostyrene, 4-monofluorostyrene and the like) and the like. Among those listed above, styrene is preferred. Any of these aromatic vinyl monomers may be used alone or in combination of two or more.

The content of each monomer unit constituting a diene-based rubber may vary depending on the characteristics required. In the case the diene-based rubber is constituted of the above-mentioned monomer unit (A) and (B), a combination (A)/(B) of each content is usually 40 to 100% by mass/60 to 0% by mass, preferably 50 to 90% by mass/50 to 10% by mass, more preferably 60 to 85% by mass/40 to 15% by mass.

An olefinic unsaturated nitrile monomer formed the olefinic unsaturated nitrile monomer unit (C) may for example be acrylonitrile, methacrylonitrile, vinylidene cyanide and the like, and any of these nitrile group-containing monomers may be used alone or in combination of two or more.

In the case the diene-based rubber is constituted of the above-mentioned monomer unit (A), (B) and (C), a combination (A)/(B)/(C) of each content is usually 20 to 81% by mass/10 to 50% by mass/9 to 30% by mass, preferably 30 to 71% by mass/20 to 50% by mass/9 to 20% by mass, more preferably 40 to 71% by mass/20 to 40% by mass/9 to 20% by mass.

The "diene-based rubber latex" described above means a latex whose contained diene-based rubber particle is dispersed in an aqueous medium. The latex may for example be a natural rubber latex, an emulsion obtained by re-emulsifying a diene-based synthetic rubber, a polymerized diene-based synthetic rubber emulsion in an aqueous medium, a diene-based synthetic rubber dispersion and the like. Any of these may be used alone or in combination of two or more regardless of the type of the diene-based rubber or the type of the aqueous dispersion.

A silicate dissolved in the "aqueous solution of a silicate (b)" described above is an alkaline salt of silicic acid such as sodium silicate and potassium silicate which are generally called water glass, and the ratio between silicon and an alkaline element is not particularly limited. Concentration of the aqueous solution of a silicate (b) is not also limited, but the concentration is selected appropriately in view of the particle size and the particle coagulation condition of the silicic acid compound to be formed since the particle size and the particle aggregation condition of the silicic acid compound described above depend on the concentration of the aqueous solution of a silicate.

The aqueous solution of a silicate (b) can be a decationized one which is made free of cations for example by means of a contact with an ion exchange resin or the like. The decationized aqueous solution of a silicate leads to a silica having a large particle size or the like. By adding an acid or an alkali to the decationized aqueous solution of a silicate, it is possible to adjust the desired pH. The procedures of decationizing and adjusting the pH control the particle coagulation condition and the particle size of the silicic acid compound to be formed.

The employing amount of the aqueous solution of a silicate (b) according to the first, second and third aspect of the method or the aqueous dispersion (b1) according to the fourth aspect of the method to be mixed with a diene-based rubber latex (a), is generally 10 to 150 parts by mass (hereinafter abbreviated as parts), preferably 20 to 100 parts when represented as a resultant silicic acid compound including silica and the like to be formed or the like based on 100 parts of the diene-based rubber contained in the diene-based rubber latex (a). The amount exceeding 150 parts leads to a difficulty in dispersing the silicic acid compound including silica and the like uniformly in the diene-based rubber, resulting in a problematically hard diene-based rubber/inorganic compound complex. On the other hand, the amount less than 10 parts may lead to an insufficient reinforcing effect of the obtained rubber product.

According to the first and third aspect of the method, when the diene-based rubber latex (a) and the aqueous solution of a silicate (b) are mixed, a silicic acid compound is formed.

The aqueous dispersion (b1) according to the fourth aspect of the method is an aqueous dispersion which is containing a silicic acid compound generated by adjusting the pH between 3 and 12 of the aqueous solution of a silicate (b) with a dilute sulfuric acid and the like. And then the aqueous dispersion (b1) is mixed with the diene-based rubber latex (a) and the like. In this case the diene-based rubber and the silicic acid compound are uniformly dispersed in the mixture <q>.

The "aqueous solution of electrolyte" described above is not particularly limited as long as it is ion-conductive. The aqueous solution of electrolyte <r> according to the first, second and fourth aspect of the method contains a cationic substance (c) which has an affinity to the diene-based rubber and a multivalent metal salt (d), and at least a part of the multivalent metal salt (d) is preferably dissolved. The aqueous solution of electrolyte <r1> according to the third aspect of the method contains a cationic substance (c) which has an affinity to the diene-based rubber and shows a characterization as an aqueous solution of electrolyte by ion. And in the aqueous solution of electrolyte <r2>, at least a part of a multivalent metal salt (d) is preferably dissolved.

The "cationic substance (c) which has an affinity to the diene-based rubber" described above is not particularly limited as long as it may be able to induce a coagulation of a diene-based rubber and a silicic acid compound which is an anionic substance. The cationic substance (c) may for example be a substance having a long chain hydrocarbon group which has an affinity to a rubber and a cationic group. Typically, a cationic polymer and a cationic surfactant may be employed.

The "cationic polymer" described above may for example be (meth)acrylic-based polymer obtained by copolymerizing a (meth)acrylic ester having an amino group or a quaternary ammonium salt and the like, (meth)acrylic ester-(meth)acrylamide copolymer, a polyamidine and the like. Some of which are employed as a polymer coagulant and have various cationic properties (ionic properties). Any of these substances may be employed alone or in combination of two or more.

The "cationic surfactant" described above may for example be an alkylamine acetate such as coconut amine acetate, stearylamine acetate, and the like, an alkylamine hydrochloride such as coconut amine hydrochloride, stearylamine hydrochloride, and the like, an alkylamine oxide such as lauryldimethylamine oxide or the like, an alkylammonium halide such as lauryltolylmethylammonium chloride or the like, stearyltolylmethylammonium chloride, cetyltolylmethylammonium chloride, distearyldimethylammonium chloride, and the like, an alkylarylammonium halide such as an alkylbenzyldimethylammonium chloride or the like, and an alkyl betaine such as lauryl betaine and stearyl betaine. Any of these surfactants may be employed alone or in combination of two or more.

The "multivalent metal salt (d)" described above is not particularly limited and may for example be a salt of an acid selected from the group of hydrochloric acid, nitric acid and sulfuric acid with a multivalent metal such as calcium, magnesium, zinc, aluminium, and the like. Those which can be exemplified are calcium chloride, magnesium chloride, zinc chloride, aluminium chloride, calcium nitrate, magnesium nitrate, zinc nitrate, aluminium nitrate, magnesium sulfate, zinc sulfate, aluminium sulfate and the like. Any of these salts may be employed alone or in combination of two or more.

The amount of the above-mentioned cationic substance (c) contained in the aqueous solution of electrolyte <r> according to the first, second and fourth aspect of the method is preferably 0.001 to 20 parts, more preferably 0.01 to 10 parts, most preferably 0.05 to 10 parts based on 100 parts of the diene-based rubber contained in the diene-based rubber latex (a).

And the amount of the above-mentioned multivalent metal salt (d) contained in the aqueous solution of electrolyte <r> is preferably 0.01 to 10 parts, more preferably 0.05 to 5 parts, most preferably 0.1 to 1 part based on 100 parts of water.

The amount of the above-mentioned cationic substance (c) contained in the first aqueous solution of electrolyte <r1> according to the third aspect of the method is preferably 0.001 to 20 parts, more preferably 0.01 to 10 parts, most preferably 0.05 to 10 parts based on 100 parts of the diene-based rubber contained in the diene-based rubber latex (a).

The amount of the above-mentioned multivalent metal salt (d) contained in the second aqueous solution of electrolyte <r2> according to the third aspect of the method is preferably 0.01 to 10 parts, more preferably 0.05 to 5 parts, most preferably 0.1 to 1 parts based on 100 parts of water.

A cationic substance (c) may be contained in the second aqueous solution of electrolyte <r2>. This cationic substance (c) may be the same as that contained in the first aqueous solution of electrolyte <r1> or a different one.

The above-mentioned aqueous solution of electrolyte according to the present invention may contain a monovalent metal salt in addition to the above-mentioned cationic substance (c) and multivalent metal salt (d).

The above-mentioned aqueous solution of electrolyte <r> according to the first, second and fourth aspect of the method contains the cationic substance (c) and the multivalent metal salt (d). By employing this aqueous solution of electrolyte <r>, a diene-based rubber and a silicic acid compound generated from the mixture <p>, <p1> or <p2> are co-coagulated while aggregating.

According to the third aspect of the method, the first aqueous solution of electrolyte <r1> containing the specific cationic substance (c) and the second aqueous solution of electrolyte <r2> containing the multivalent metal salt (d) are employed in this order. In this case, after a diene-based rubber and a silicic acid compound are aggregated or in aggregation by the cationic substance (c) contained in the first aqueous solution of electrolyte <r1>, they are co-coagulated by mixing the mixture <p2> and the second aqueous solution of electrolyte <r2> in the next process.

While a method of co-coagulating a diene-based rubber and a silicic acid compound using the above-mentioned aqueous solution of electrolytes is not limited particularly, the coagulation can be effected by a method similar to an ordinary coagulation method for recovering a solid rubber from an emulsion polymerization rubber latex. For example, (1) the method in which an aqueous solution of electrolytes is brought into contact with the mixture <p> or <p1> of the diene-based rubber latex (a) and the aqueous solution of a silicate (b), or the mixture <q> of the diene-based rubber latex (a) and the aqueous dispersion (b1) by the method such as an ejector, (2) the method in which the mixture <p>, <p1> or <q> are poured into water or an aqueous solution of an electrolyte <r3> after above-mentioned (1), and the like are employed. The aqueous solution of an electrolyte <r3> may contain a specific cationic substance (c), a multivalent metal salt (d) and a monovalent metal salt. While the temperature and the pH at which a co-coagulation is effected are not limited particularly, a reduction in any inorganic salts remaining in a resultant diene-based rubber/inorganic compound complex can be ensured by controlling the temperature at 100° C. or higher and the pH within the range from 2 to 14 usually, more preferably 3 to 12.

In the case a aqueous solution of electrolyte containing the multivalent metal salt (d) is employed alone or a aqueous solution of electrolyte containing the multivalent metal salt (d) without the specific cationic substance (c) is employed, a diene-based rubber and a silicic acid compound generated from the silicate are formed discrete coagulations in stead of integrated, which leads to a difficulty in obtaining a diene-based rubber/inorganic compound complex containing the silicic acid compound being dispersed uniformly in the diene-based rubber. By allowing the multivalent metal salt (d) to co-exist with the cationic substance (c) which has an affinity to the diene-based rubber according to the invention, a complex which contains the silicic acid compound as being dispersed uniformly in the diene-based rubber and which is capable of exerting a sufficient reinforcing effect can be obtained.

After co-coagulating a diene-based rubber and a silicic acid compound, the coagulated material is washed with water to remove emulsifiers, elecytolites and the like. Then the coagulated material is made free of water for example by means of a hot air blower. The method of drying the coagulated material is not limited particularly. Finally, a complex containing a silicic acid compound being dispersed uniformly in a diene-based rubber can be obtained.

The particle size of a silicic acid compound including silica and the like generated here is preferably 200 nm or less, particularly 150 nm or less. A particle size exceeding 200 nm is not preferable since the reinforcing effect of a silicic acid compound is not obtained sufficiently. The particle of a silicic acid compound may also be porous. A silicic acid compound as a particle whose size is 200 nm or less may be dispersed individually in a diene-based rubber after co-coagulation, or the compound may be dispersed in the form of a higher order structure resulting from aggregation of particles.

A diene-based rubber contained in the diene-based rubber latex may be used a rubber having hetero atom-containing polar group. In this case it is preferable in view of the dispersibility of a silicic acid compound including silica and the like in the dien-based rubber and the reinforcing effect of the result rubber product.

A hetero atom may for example be an atom of an element in 5B or 6B group in 2 to 4 periods in the periodic table, typically, nitrogen, oxygen, sulfur, phosphorus atoms, and the like. Among those listed above, nitrogen and oxygen atoms and the like are preferred. A polar group having such hetero atom may for example be hydroxyl, alkoxysilyl, epoxy, carboxyl, carbonyl, oxycarbonyl, sulfide, disulfide, sulfonyl, sulfinyl, thiocarbonyl, imino, amino, nitrile, ammonium, imide, amide, hydrazo, azo, diazo, oxygen-containing heterocyclic, nitrogen-containing heterocyclic, sulfur-containing heterocyclic groups and the like.

Among those polar groups, hydroxyl, alkoxysilyl, epoxy, carboxyl, sulfide, sulfonyl, amino, nitrogen-containing heterocyclic groups and the like are preferred. Those more preferred are hydroxyl, alkoxysilyl, carboxyl, amino, nitrogen-containing heterocyclic groups, and the like, with those preferred particularly being hydroxyl and amino groups.

A diene-based rubber having a hetero atom-containing polar group can be produced by using a vinyl monomer having a polar group. Such monomer is not limited particularly as long as it has at least one polar group in its molecule. Typically, a vinyl monomer having a polar group such as carboxyl, alkoxysilyl, amino, hydroxyl and nitrile groups may be exemplified. Among those listed above, vinyl monomers having carboxyl, alkoxysilyl, amino groups, and the like are preferred. Any of such polar group-containing vinyl monomer may be employed alone or in combination of two or more.

A hydroxyl group-containing vinyl monomer may be a monomer having at least one primary, secondary or tertiary hydroxyl group in its molecule. Such monomer may for example be an unsaturated carboxylic acid-based monomer, a vinyl ether-based monomer and a vinyl ketone-based monomer each having a hydroxyl group or the like. Among those listed above, an unsaturated carboxylic acid-based monomer having a hydroxyl group is preferred. The unsaturated carboxylic acid-based monomer having a hydroxyl group may for example be an unsaturated acid such as acrylic acid, methacrylic acid, itaconic acid, fumaric acid and maleic acid as well as derivatives of these unsaturated acids such as esters, amides or anhydrides. Among those listed above, an ester compound of acrylic acid, methacrylic acid and the like are preferred.

Typical examples of a vinyl monomer having a hydroxyl group are listed below.

(1) Hydroxyalkyl (meth)acrylates; 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate and the like, (2) mono(meth)acrylates of a polyalkylene glycol (for example, 2 to 23 alkylene glycol units) such as polyethylene glycol and polypropylene glycol, (3) hydroxyl group-containing unsaturated amides; N-hydroxymethyl (meth)acrylamide, N-(2-hydroxyethyl) (meth)acrylamide, N,N-bis(2-hydroxyethyl) (meth)acrylamide and the like, (4) hydroxyl group-containing aromatic vinyl compounds; o-hydroxystyrene, m-hydroxystyrene, p-hydroxystyrene, o-hydroxy-α-methylstyrene, m-hydroxy-α-methylstyrene, p-hydroxy-α-methylstyrene, p-vinylbenzylalcohol and the like; and, (5) (meth)allylalcohol or the like.

Among those listed above, hydroxyalkyl (meth)acrylates and hydroxyl group-containing aromatic vinyl compounds are preferred. Any of these hydroxyl group-containing monomers may be employed alone or in combination of two or more.

A nitrile group-containing monomer may for example be vinylidene cyanide and the like. Any of these nitrile group-containing monomers may be employed alone or in combination of two or more.

An amino group-containing vinyl monomer may be a monomer having a primary, secondary or tertiary amino group in its molecule. Among such monomers, a dialkylaminoalkyl (meth)acrylate and a monomer having a tertiary amino group such as a tertiary amino group-containing aromatic vinyl compound or the like are preferred. Any of these amino group-containing vinyl monomers may be employed alone or in combination of two or more.

A primary amino group-containing vinyl monomer may for example be acrylamide, methacrylamide, p-aminostyrene, aminomethyl (meth)acrylate, aminoethyl (meth)acrylate, aminopropyl (meth)acrylate, aminobutyl (meth)acrylate, and the like.

A secondary amino group-containing vinyl monomer may for be example those listed below.

(1) Anilinostyrenes; anilinostyrene, β-phenyl-p-anilinostyrene, β-cyano-p-anilinostyrene, β-cyano-β-methyl-p-anilinostyrene, β-chloro-p-anilinostyrene, β-methyl-β-methoxycarbonyl-p-anilinostyrene, β-carboxy-p-anilinostyrene, β-methoxycarbonyl-p-anilinostyrene, β-(2-hydroxyethoxy)carbonyl-p-anilinostyrene, β-formyl-p-anilinostyrene, β-formyl-β-methyl-p-anilinostyrene, α-carboxy-p-carboxy-β-phenyl-p-anilinostyrene, and the like;

(2) anilinophenyl butadienes and derivative thereof; 1-anilinophenyl-1,3-butadiene, 1-anilinophenyl-3-methyl-1,3-butadiene, 1-anilinophenyl-3-chloro-1,3-butadiene, 3-anilinophenyl-2-methyl-1,3-butadiene, 1-anilinophenyl-2-chloro-1,3-butadiene, 2-anilinophenyl-1,3-butadiene, 2-anilinophenyl-3-methyl-1,3-butadiene and anilinophenyl-3-chloro-1,3-butadiene;

(3) N-monosubstituted (meth)acryliamides; N-methyl (meth)acrylamide, N-ethyl (meth)acrylamide, N-methylol acrylamide, N-(4-anilinophenyl)methacrylamide, and the like.

A tertiary amino group-containing vinyl monomer may for example be an N,N-disubstituted aminoalkyl acrylate, an N,N-disubstituted aminoalkyl acrylamide, an N,N-disubstituted aminoaromatic vinyl compound, a pyridine group-containing vinyl compound and the like.

N,N-disubstituted aminoacrylates may be used esters of acrylic acid or methacrylic acid such as N,N-dimethylaminomethyl (meth)acrylate, N,N-dimethylaminoethyl (meth)acrylate, N,N-dimethylaminopropyl (meth)acrylate, N,N-dimethylaminobutyl (meth)acrylate, N,N-diethylaminoethyl (meth)acrylate, N,N-diethylaminopropyl (meth)acrylate, N,N-diethylaminobutyl (meth)acrylate, N-methyl-N-ethylaminoethyl (meth)acrylate, N,N-dipropylaminoethyl (meth)acrylate, N,N-dibutylaminoethyl (meth)acrylate, N,N-dibutylaminopropyl (meth)acrylate, N,N-dibutylaminobutyl (meth)acrylate, N,N-dihexylaminoethyl (meth)acrylate, N,N-dioctylaminoethyl (meth)acrylate, acryloyl morphline, and the like.

Among those listed above, one employed preferably is N,N-dimethylaminoethyl (meth)acrylate, N,N-diethylaminoethyl (meth)acrylate, N,N-dipropylaminoethyl (meth)acrylate, N,N-dioctylaminoethyl (meth)acrylate, N-methyl-N-ethylaminoethyl (meth)acrylate and the like.

N,N-disubstituted aminoalkyl acrylamides may be used acrylamide compounds or methacrylamide compounds such as N,N-dimethylaminomethyl (meth)acrylamide, N,N-dimethylaminoethyl (meth)acrylamide, N,N-dimethylaminopropyl (meth)acrylamide, N,N-dimethylaminobutyl (meth)acrylamide, N,N-diethylaminoethyl (meth)acrylamide, N,N-diethylaminopropyl (meth)acrylamide, N,N-diethylaminobutyl (meth)acrylamide, N-methyl-N-ethylaminoethyl (meth)acrylamide, N,N-dipropylaminoethyl (meth)acrylamide, N,N-dibutylaminoethyl (meth)acrylamide, N,N-dibutylaminopropyl (meth)acrylamide, N,N-dibutylaminobutyl (meth)acrylamide, N,N-dihexylaminoethyl (meth)acrylamide, N,N-dihexylaminopropyl (meth)acrylamide, N,N-dioctylaminopropyl (meth)acrylamide and the like.

Among those listed above, one employed preferably is N,N-dimethylaminopropyl (meth)acrylamide, N,N-diethylaminopropyl (meth)acrylamide, N,N-dioctylaminopropyl (meth)acrylamide and the like.

N,N-disubstituted aminoaromatic vinyl compounds may be used N,N-dimethylaminoethylstyrene, N,N-diethylaminoethylstyrene, N,N-dipropylaminoethylstyrene, N,N-dioctylaminoethylstyrene and the like.

An amino group-containing vinyl monomer may also be a monomer having a nitrogen-containing heterocyclic group. A nitrogen-containing heterocyclic ring as a constituent of such monomer may for example be pyrrole, histidine, imidazole, triazolidine, triazole, triazine, pyridine, pyrimidine, pyrazine, indole, quinoline, purine, phenazine, puteridine, melamine, and the like. A nitrogen-containing heterocyclic ring may have two or more species of hetero atoms. A vinyl compound having a pyridyl group may for example be 2-vinylpyridine, 3-vinylpyridine, 4-vinylpyridine, 5-methyl-2-vinylpyridine, 5-ethyl-2-vinylpyridine, and the like. Among those listed above, one employed preferably is 2-vinylpyridine, 4-vinylpyridine and the like.

An epoxy group-containing monomer may for example be (meth)acrylglycidyl ether, glycidyl (meth)acrylate, 3,4-oxycyclohexyl (meth)acrylate, and the like. Any of these epoxy group-containing monomers may be employed alone or in combination of two or more.

A carboxyl group-containing monomer may for example be unsaturated carboxylic acids such as (meth)acrylic acid, maleic acid, fumaric acid, itaconic acid, tetraconic acid, cinnamic acid, and the like. One which may also be employed is an ester having a free carboxyl group such as a monoester of a non-polymerizable multivalent carboxylic acid such as phthalic acid, succinic acid, adipic acid, and the like with a hydroxyl group-containing unsaturated compound such as (meth)allyl alcohol, 2-hydroxyethyl (meth)acrylate, and the like. Among those listed above, an unsaturated carboxylic acid is preferred. Any of such carboxyl group-containing monomers may be employed alone or in combination of two or more.

An alkoxysilyl group-containing monomer may for example be (meth)acryloxymethyl trimethoxysilane, (meth)acryloxymethyl methyldimethoxysilane, (meth)acryloxymethyl dimethylmethoxysilane, (meth)acryloxymethyl triethoxysilane, (meth)acryloxymethyl methyldiethoxysilane, (meth)acryloxymethyl dimethylethoxysilane, (meth)acryloxymethyl tripropoxysilane, (meth)acryloxymethyl methyldipropoxysilane, (meth)acryloxymethyl dimethylpropoxysilane, γ-(meth)acryloxypropyl trimethoxysilane, γ-(meth)acryloxypropyl methyldimethoxysilane, γ-(meth)acryloxypropyl dimethylmethoxysilane, γ-(meth)acryloxypropyl triethoxysilane, γ-(meth)acryloxypropyl methyldiethoxysilane, γ-(meth)acryloxypropyl dimethylethoxysilane, γ-(meth)acryloxypropyl tripropoxysilane, γ-(meth)acryloxypropyl methyldipropoxysilane, γ-(meth)acryloxypropyl dimethylpropoxysilane, γ-(meth)acryloxypropyl methyldiphenoxysilane, γ-(meth)acryloxypropyl dimethylphenoxysilane and γ-(meth)acryloxypropyl methyldibenzyloxysilane, γ-(meth)acryloxypropyl dimethylbenzyloxysilane, and the like.

Such monomer may also be an alkoxysilyl group-containing vinyl monomer disclosed in Japanese Patent laid-open publication No. HEI-7-188356 such as trimethoxyvinylsilane, triethoxyvinylsilane, 6-trimethoxysilyl-1-hexene, p-trimethoxysilylstyrene and the like. Any of those alkoxysilyl group-containing monomers may be employed alone or in combination of two or more.

The content of a monomer unit formed by the polar group-containing monomer of the diene-based rubber having a hetero atom-containing polar group may vary depending on the polarity of the polar group, and preferred is usually 0.01 to 20% by mass based on 100% by mass of the total of the diene-based rubber. The content less than 0.01% by mass leads to a low interaction with an inorganic compound even if the monomer has a high polarity, resulting in a difficulty in obtaining a sufficient effect. On the other hand, the content exceeding 20% by mass leads to an earlier aggregation with an inorganic compound, resulting in a difficulty in processing.

In the case using a diene-based rubber latex contained a diene-based rubber having a polar group containing monomer unit content within the range specified above, a rubber composition having the wearing resistance, the heat generation profile and the wet skid resistance which are well-balanced can be obtained.

A method for polymerizing the above-mentioned diene-based rubber is not limited particularly, and it may for example be a radical polymerization method, an anionic polymerization method and the like. While a radical polymerization method may for example be a bulk polymerization, a suspension polymerization, an emulsion polymerization and the like, an emulsion polymerization allowing a stable emulsion dispersion to be obtained at the end of the polymerization is preferred since the present invention employs as a diene-based rubber latex. Such emulsion polymerization may be performed by any ordinary method, such as a method in which a certain monomer is emulsified in an aqueous medium in the presence of an emulsifier and the polymerization is initiated using a radical initiator and then terminated using an inhibitor once a predetermined conversion is achieved or the like.

An emulsifier may for example be an anionic surfactant, a nonionic surfactant, a cationic surfactant, an amphoteric surfactant and the like. A fluorine-based surfactant may also be employed. Any of such surfactants may be employed alone or in combination of two or more. An anionic surfactant is employed usually, such as a long chain fatty acid salt having 10 or more carbon atoms or rosin acid salt or the like. Typical example includes potassium and sodium salts of capric acid, lauric acid, myristic acid, palmitic acid, oleic acid, stearic acid and the like.

A radical initiator may for example be organic peroxides such as benzoyl peroxide, lauroyl peroxide, tert-butyl hydroperoxide, cumene hydroperoxide, p-menthane hydroperoxide, di-tert-butyl peroxide, dicumyl peroxide. Those which may also be employed are azo compounds such as azobisisobutyronitrile, inorganic peroxides such as potassium persulfate as well as redox catalysts such as any of these peroxides in combination with ferrous sulfate or the like. Any of these radical initiators may be used alone or in combination of two or more.

For the purpose of adjusting the molecular weight of the diene-based rubber, a chain transferring agent can be employed. Such chain transferring agent may for example be alkylmercaptans such as tert-dodecylmercaptan and n-dodecylmercaptan, carbon tetrachloride, a thioglycol, diterpene, terpinolene and γ-terpinene and the like.

In a diene-based rubber polymerization, various components such as an monomer, an emulsifier, a radical initiator, a chain transferring agent and the like may be added in a reactor all at once for starting the polymerization, or they are added intermittently or continuously over a period of the reaction. The polymerization can be effected in an oxygen-free reactor at a temperature of between 0 and 100° C., preferably between 0 and 80° C. In the course of the reaction, the operating conditions such as the temperature, the stirring or the like may be changed appropriately. The polymerization may be of a continuous process or a batch process.

Since a higher conversion of the polymerization may leads to a gelation, the conversion of the polymerization is preferably less than 80%. And it is preferable to terminate the polymerization especially at a conversion of 30 to 70%. The polymerization can be terminated, once a predetermined conversion is accomplished, by adding an inhibitor. Such inhibitor may for example be an amine compound such as hydroxylamine, diethylhydroxylamine, and the like or a quinone or the like compound such as hydroquinone or the like. After terminating the polymerization, the reaction system is made free of unreacted monomers if necessary by means of steam distillation and the like, whereby obtaining an inventive diene-based rubber latex.

A diene-based rubber latex (a) can be used together with an extending oil for a rubber dispersed therein. Such extending oil for a rubber is not particularly limited, and may for example be a naphthenic, paraffinic or aromatic process oil. The amount of the extending oil for a rubber to be dispersed in the diene-based rubber latex (a) is 5 to 100 parts, especially 10 to 60 parts based on 100 parts of the diene-based rubber contained in the diene-based rubber latex (a).

Mooney viscosity [$ML_{1+4}$ (100° C.)] of a diene-based rubber contained in the diene-based rubber latex (a) is preferably 10 to 200, especially 30 to 150. The Mooney viscosity less than 10 leads to a reduced wearing resistance of a vulcanized rubber or the like. On the other hand, the viscosity exceeding 200 results in a poor processability of a rubber composition, which may lead to a difficulty in kneading.

The rubber composition of the invention is comprised of the above-mentioned diene-based rubber/inorganic compound complex.

While various formulation additives may usually be employed in the rubber composition, an additional rubber which is other than the diene-based rubber contained in the diene-based rubber latex (a) employed for producing a complex can also be incorporated. Such additional rubber is not limited particularly, and may for example be a styrene-butadiene copolymeric rubber, a butadiene rubber, an isoprene rubber, a butadiene-isoprene copolymeric rubber, a butadiene-styrene-isoprene copolymeric rubber, an acrylonitrile-butadiene copolymeric rubber, an acrylonitrile-styrene-butadiene copolymeric rubber, an acryl rubber, a butyl rubber, a natural rubber and a chloroprene rubber, as well as a rubber copolymerized a polar group-containing monomer or the like. Any of the additional rubbers may be used alone or in combination of two or more.

The amount of the additional rubber to be incorporated is preferably 1 to 500 parts, more preferably 10 to 200 parts, most preferably 10 to 100 parts based on 100 parts of the diene-based rubber contained in the diene-based rubber latex (a).

The rubber composition may contain a vulcanizing agent. While a representative vulcanizing agent is sulfur, other materials such as sulfur-containing compounds, peroxides and the like may also be employed. The amount of the vulcanizing agent to be added is usually 0.5 to 10 parts, especially 1 to 6 parts, based on 100 parts of total of the rubber components.

The rubber composition may contain at least one of a carbon black and a silica. While such carbon black may be classified on the basis of the production method into a channel black, a furnace black, an acetylene black or a thermal black, any class may be employed. It is also preferred that a carbon black has a nitrogen adsorption specific surface area (BET value) of 70 m$^2$/g or higher and a dibutyl phthalate permeation (DBP value) of 90 mL/100 g or higher.

The BET value less than 70 m$^2$/g leads to a difficulty in obtaining a sufficient wearing resistance, while an excessively higher BET value leads to a difficulty in reducing the gas mileage sufficiently when being used as a tire. When taking the both of the wearing resistance and the gas mileage into consideration, a preferable range of the BET value is 90 to 180 m$^2$/g. The BET value mentioned here is a value determined in accordance with ASTM D3037-88. On the other hand, the DBP value less than 90 mL/100 g leads to a difficulty in obtaining a sufficient wearing resistance, while an excessively high DBP value may leads to a reduced elongation at break of the resultant rubber composition.

When taking the both of the wearing resistance and the gas mileage into consideration, a preferable range of the DBP value is 100 to 180 mL/100 g. The DBP value mentioned here is a value determined in accordance with JIS K6221-1982 (Method A).

A silica is not limited particularly and any of those employed customarily as a reinforcing agent for a rubber such as a dry silica, a wet silica (hydrated silicic acid), and the like may be employed, with a wet silica being preferred. When taking the both of the wearing resistance and the gas mileage into consideration, a silica having a BET value within the range from 100 to 300 m$^2$/g is preferred. The BET value mentioned here is a value determined in accordance with ASTM D4820-93 after drying at 300° C. for 1 hour.

The invention may employ either of a carbon black or a silica, or may employ the both. The amount of these components to be added ranges preferably from 5 to 85 parts based on 100 parts of total of the rubber components for the purpose of well-balanced wearing resistance, wet skid resistance, low gas mileage, and the like.

An additional reinforcing filler may for example be aluminium hydroxide, a clay, calcium carbonate, magnesium carbonate and the like. Any of the additional reinforcing fillers may be used alone or in combination of two or more.

The rubber composition of the invention may contain a silane coupling agent for the purpose of further improving the wearing resistance or the tans. Such silane coupling agent is not limited particularly, and may for example be vinyltrichlorosilane, vinyltriethoxysilane, vinyltris(β-methoxyethoxy)silane, β-(-(3,4-epoxycyclohexyl)-ethyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-(3-(triethoxysilyl)propyl) tetrasulfide, bis-(3-(triethoxysilyl)propyl) disulfide, γ-trimethoxysilylpropyldimethylthocarbamyl tetrasulfide, γ-trimethoxysilylpropylbenzothiazyl tetrasulfide and the like. Any of the silane coupling agents may be used alone or in combination of two or more. The amount of the silane coupling agent to be added is preferably 1 to 20 parts, especially 2 to 15 parts based on 100 parts of total amount of the silicic acid compound contained in the above-mentioned diene-based rubber/inorganic compound complex and the silica to be incorporated additionally.

The rubber composition may also contain fatty acids. Fatty acids may for example be a fatty acid, an ester thereof and the like. Preferred is a higher fatty acid, a monocarboxylic acid having 10 or more (preferably 12 or more, usually not more than 20) carbon atoms is usually employed, which may be saturated or unsaturated, with a saturated fatty acid being preferable in view of the weather resistance. Examples of such fatty acid are palmitic acid, stearic acid, oleic acid, linoleic acid, linolenic acid and the like. An ester compound of a fatty acid is preferably an ester derived from an alcohol compound of a higher fatty acid described above. The number of the carbon atoms possessed by such alcohol compound is not particularly limited, and usually about 1 to 10. An ester of a lower fatty acid (having 1 to about 10 carbon atoms) with a higher alcohol (having about 10 or more and not more than about 20 carbon atoms) may also be employed. Any of the fatty acids may be used alone or in combination of two or more.

The rubber composition may contain a vulcanization accelerator or the like in addition to the additives described above. Such vulcanization accelerator may for example be an aldehyde ammonia-based, guanidine-based, thiourea-based, thiazole-based, dithiocarbamic acid-based substances and the like. Any of the vulcanization accelerators may be used alone or in combination of two or more. The amount to be added is preferably 0.5 to 15 parts, especially 1 to 10 parts based on 100 parts of total of the rubber components. In addition to the inorganic filler added as a reinforcing agent, various inorganic fillers may be added in appropriate amounts. Naphthenic, paraffinic or aromatic extending oils for rubbers or the like may also be incorporated. In addition, zinc oxide, vulcanizing aids, anti-aging agents, processing aids and the like may also be added in appropriate amounts.

The rubber composition of the invention and a rubber product made from the rubber composition are can be produced by the following method.

First, a complex, optionally other rubber components, a reinforcing agent such as a carbon black and a silica, an extending oil for a rubber, and other auxiliary components are kneaded using a kneader such as Banbury mixer or the like at a temperature of 70 to 180° C. Subsequently, the kneaded mixture is cooled and combined with a vulcanizing agent such as a sulfur or the like and a vulcanizing promoter or the like using Banbury mixer, a mixing roll, and the like to mold into a desired shape. A vulcanization at a temperature of 140 to 180° C. is then effected to obtain a desired vulcanized rubber, i.e., a rubber product.

A rubber composiiton containing a diene-based rubber/inorganic compound complex produced by a method of the invention has a satisfactory processability. A vulcanized rubber obtained from this rubber composition has excellent wet skid resistance, tensile strength, repelling elasticity, wearing resistance, and the like. This rubber composition can satisfactorily be employed for rubber products in various applications due to its excellent properties. For example, a use can be made in a compact- or large-sized automobile tire tread and side wall, as well as an industrial products such as rubber rolls, belts, hoses, rubber-lined fabrics and the like, shoes and health care products, and a particularly preferable use is made in an automobile tire, especially a tire tread.

DESCRIPTION OF THE PREFERRED EMBODIMENTS

The present invention is further described in detail in the following Examples.

[1] Methods for Determining Bound Contents of Used Monomers and Physical Parameters Physical parameters of diene-based rubbers in Reference Production Examples and rubber composition in Examples and Comparatives were determined as described below.

(1) Bound styrene content (% by mass); An infrared absorption spectroscopy was used to obtain a calibration curve, from which a bound content was obtained.

(2) Bound contents of nitrile group-containing monomer and amino group-containing monomer (% by mass); A rubber was dissolved in toluene and re-precipitated from methanol, and this procedure was repeated twice to purify the rubber, which was then dried in vacuum, subjected to an elemental analysis to obtain a nitrogen content, from which a bound content was obtained.

(3) Bound content of hydroxyl group-containing monomer (% by mass); A rubber was dissolved in toluene and re-precipitated from methanol, and this procedure was repeated twice to purify the rubber, which was then dried in vacuum and analyzed by $^1$H-NMR at 270 MHz.

(4) Bound content of carboxyl group-containing monomer (% by mass); A rubber was dissolved in toluene and re-precipitated from methanol, and this procedure was repeated twice to purify the rubber, which was then dried in vacuum, dissolved in chloroform, and then titrated until being neutralized.

(5) Bound content of butyl acrylate (% by mass); A rubber was dissolved in toluene and re-precipitated from methanol, and this procedure was repeated twice to purify the rubber, which was then dried in vacuum and analyzed by $^{13}$C-NMR at 270 MHz.

(6) Bound content of alkoxysilyl group-containing monomer (% by mass); A rubber was dissolved in toluene and re-precipitated from methanol, and this procedure was repeated twice to purify the rubber, which was then dried in vacuum and analyzed by $^1$H-NMR at 270 MHz.

(7) Mooney viscosity [$ML_{1+4}$ (100° C.)]; A measurement was performed in accordance with JIS K 6300-1994 at 100° C. with the preliminary heating for 1 minutes and the measuring time of 4 minutes.

(8) Mooney viscosity of the rubber composition; Components shown in Table 5 are mixed and kneaded to form a rubber composition, and it was examined for its Mooney viscosity by the method described in (7). A value obtained was converted into its reciprocal, which was indicated as an index on the basis of Comparative Experiment being regarded as 100. A higher index reflected a lower viscosity and a better processability.

(9) Tensile strength; A tensile strength (MPa) was measured in accordance with JIS K 6301-1995 using No. 3 test piece at 25° C. with a tensile speed of 500 mm/minute. The strength was indicated as an index on the basis of Comparative Experiment being regarded as 100. A higher index reflected a higher tensile strength.

(10) Impact resilience index; An impact resilience index was determined using DUNLOP Tripsometer at 50° C. The impact resilience index was indicated as an index on the basis of Comparative Experiment being regarded as 100. A higher index reflected a higher impact resilience.

(11) Tanδ; A tanδ was determined using a dynamic analyzer (RDA) manufactured by Rheometrics in United States at the dynamic strain of 3%, the frequency of 10 Hz and the temperature of 50° C. A value obtained was converted into its reciprocal, which was indicated as an index on the basis of Comparative Experiment being regarded as 100. A higher index reflected a lower rolling resistance, which was the better results.

(12) Wearing index; A wearing level was calculated at the slip rate of 60% using a wearing tester of Lambourn type. The measurement was made at 50° C. The reciprocal of a wearing level was indicated as an index on the basis of Comparative Experiment being regarded as 100. A higher index reflected a better wearing resistance.

[2] Production of Diene-Based Rubbers

REFERENCE PRODUCTION EXAMPLE 1

200 parts of water, 4.5 parts of rosin acid soap, 72 parts of butadiene, 28 parts of styrene and 0.3 parts of t-dodecylmercaptane were charged into a polymerization vessel purged with nitrogen. Subsequently, the temperature of the polymerization vessel was set at 5° C., and 0.1 parts of p-menthane hydroperoxide as a radical initiator, 0.07 parts of sodium ethylene diamine tetraacetate, 0.05 parts of ferrous sulfate heptahydrate and 0.15 parts of sodium formaldehyde sulfoxylate were added to initiate the polymerization, and once the conversion of the polymerization reached 60%, diethylhydroxylamine was added to terminate the polymerization. Subsequently, any unreacted monomer was recovered by steam stripping to obtain a diene-based rubber latex (a) whose solid content was 21%.

Subsequently, the diene-based rubber latex (a) was coagulated by sulfuric acid and sodium chloride to obtain crumb, which was dried by a hot air blower to obtain a diene-based rubber A. Mooney viscosity and the bound styrene content of this diene-based rubber A are shown in Table 1.

REFERENCE PRODUCTION EXAMPLES 2 TO 5

Similarly to Reference Production Example 1 except for using the monomers in the amounts shown in Table 1, diene-based rubbers B to E were produced. The bound monomer content and Mooney viscosity of each of the diene-based rubbers B to E which were determined as described above are also shown in Table 1.

TABLE 1

| Diene-based rubber | | A | B | C | D | E |
|---|---|---|---|---|---|---|
| Formulation (parts by mass) | Butadiene | 72 | 76 | 71.5 | 71 | 71 |
| | Styrene | 28 | 16 | 28 | 28 | 28 |
| | Acrylonitrile | | 8 | | | |
| | 2-Hydroxyethyl methacrylate | | | 0.5 | | |
| | Diethylaminoethyl methacrylate | | | | 1 | |
| | Itaconic acid | | | | | 1 |
| Bound content % | Styrene | 23.5 | 13 | 23.5 | 23.5 | 23.5 |
| | Acrylonitrile | | 10 | | | |
| | 2-Hydroxyethyl methacrylate | | | 0.3 | | |
| | Diethylaminoethyl methacrylate | | | | 0.7 | |
| | Itaconic acid | | | | | 0.6 |
| Mooney viscosity | | 50 | 48 | 47 | 51 | 48 |

REFERENCE PRODUCTION EXAMPLE 6

200 parts of water, 4.5 parts of rosin acid soap, 58 parts of butadiene, 42 parts of styrene and 0.2 parts of t-dodecylmercaptane were charged into a polymerization vessel purged with nitrogen. Subsequently, the temperature of the polymerization vessel was set at 5° C., and 0.03 parts of p-menthane hydroperoxide as a radical initiator, 0.02 parts of sodium ethylene diamine tetraacetate, 0.01 parts of ferrous sulfate heptahydrate and 0.03 parts of sodium formaldehyde sulfoxylate were added to initiate the polymerization, and, once the conversion of the polymerization reached 60%, diethylhydroxylamine was added to terminate the polymerization. Subsequently, any unreacted monomer was recovered by steam stripping to obtain a diene-based rubber latex (f) whose solid content was 22%.

Subsequently, based on 100 parts of the solid of the diene-based rubber latex (f), 37.5 parts of an aromatic oil contained in an emulsion was added, and the mixture was coagulated by adding further sulfuric acid and sodium chloride to obtain crumb, which was dried by a hot air blower to obtain a diene-based rubber F which was extended by the aromatic oil shown in Table 2. This oil-extended diene-based rubber F had the bound styrene content and Mooney viscosity which are shown in Table 2.

REFERENCE PRODUCTION EXAMPLES 7 TO 15

Similarly to Reference Production Example 6 except for using the monomers in the amounts shown in Table 2, oil-extended diene-based rubbers G to O were produced. The bound monomer content and Mooney viscosity of each of the diene-based rubbers G to O which were determined as described above are also shown in Table 2.

TABLE 2

| Oil-extended diene-based rubber | | F | G | H | I | J | K | L | M | N | O |
|---|---|---|---|---|---|---|---|---|---|---|---|
| Formulation (parts by mass) | Butadiene | 58 | 66 | 57.5 | 57 | 57 | 57 | 57 | 51 | 56 | 57.5 |
| | Styrene | 42 | 26 | 42 | 42 | 42 | 42 | 42 | 42 | 42 | 42 |
| | Acrylonitrile | | 8 | | | | | | | | |
| | 2-Hydroxyethyl methacrylate | | | 0.5 | | | | | | | |
| | Diethylaminoethyl methacrylate | | | | 1 | | | | | | |
| | 4-Vinyl pyridine | | | | | 1 | | | | | |
| | Methacrylic acid | | | | | | 1 | | | | |
| | Itaconic acid | | | | | | | 1 | | | |
| | Butyl acrylate | | | | | | | | 7 | | |
| | Methacrylamide | | | | | | | | | 2 | |
| | γ-Methacryl oxypropyl methacrylate | | | | | | | | | | 0.5 |
| Bound content (%) | Styrene | 35 | 20 | 35 | 35 | 35 | 35 | 35 | 35 | 35 | 35 |
| | Acrylonitrile | | 10 | | | | | | | | |
| | 2-Hydroxyethyl methacrylate | | | 0.3 | | | | | | | |
| | Diethylaminoethyl methacrylate | | | | 0.7 | | | | | | |
| | 4-Vinyl pyridine | | | | | 0.6 | | | | | |
| | Methacrylic acid | | | | | | 0.8 | | | | |
| | Itaconic acid | | | | | | | 0.6 | | | |
| | Butyl acrylate | | | | | | | | 4 | | |
| | Methacrylamide | | | | | | | | | 0.9 | |
| | γ-Methacryloxypropyl methacrylate | | | | | | | | | | 0.4 |
| Extending oil (parts by mass) | | 37.5 | 37.5 | 37.5 | 37.5 | 37.5 | 37.5 | 37.5 | 37.5 | 37.5 | 37.5 |
| Mooney viscosity | | 50 | 52 | 48 | 51 | 52 | 49 | 48 | 53 | 51 | 52 |

REFERENCE PRODUCTION EXAMPLES 16 TO 20

200 parts of water, 4.5 parts of rosin acid soap, butadiene and other monomers in the amounts indicated in Table 3 (represented by parts by mass based on the total amount of the monomers amounting to 100 parts by mass) together with 0.7 parts of t-dodecylmercaptane were charged into a polymerization vessel purged with nitrogen. Subsequently, the temperature of the polymerization vessel was set at 5° C., and 0.1 parts of p-menthane hydroperoxide as a radical initiator, 0.07 parts of sodium ethylene diamine tetraacetate, 0.05 parts of ferrous sulfate heptahydrate and 0.15 parts of sodium formaldehyde sulfoxylate were added to initiate the polymerization, and, once the conversion of the polymerization reached 60%, diethylhydroxylamine was added to terminate the polymerization. Subsequently, any unreacted monomer was recovered by steam stripping to obtain each diene-based rubber latex whose solid content was 21%.

Subsequently, each diene-based rubber latex was coagulated by sulfuric acid and sodium chloride to obtain crumb, which was dried by a hot air blower to obtain each of diene-based rubbers P to T. The bound monomer content and Mooney viscosity of each of the diene-based rubbers P to T which were determined as described above are also shown in Table 3.

TABLE 3

| Diene-based rubber | | P | Q | R | S | T |
|---|---|---|---|---|---|---|
| Formulation (parts by mass) | Butadiene | 100 | 92 | 99.5 | 99 | 99 |
| | Acrylonitrile | | 8 | | | |
| | 2-Hydroxyethyl methacrylate | | | 0.5 | | |
| | Diethylaminoethyl methacrylate | | | | 1 | |
| | Methacrylic acid | | | | | 1 |
| Bound content % | Acrylonitrile | | 10 | | | |
| | 2-Hydroxyethyl methacrylate | | | 0.3 | | |
| | Diethylaminoethyl methacrylate | | | | 0.6 | |
| | Methacrylic acid | | | | | 0.7 |
| Mooney viscosity | | 48 | 49 | 50 | 48 | 52 |

[3] Production of Diene-Based Rubber/Inorganic Compound Complexes

EXAMPLE 1

JIS #3 Sodium silicate was diluted with distilled water to form an aqueous solution of a silicate containing 5% by mass, as $SiO_2$, of a silicic acid compound, and 800 g of this aqueous solution was combined with 476 g of the diene-based rubber latex (a). Subsequently, the mixture was added to 8300 g of an aqueous solution of electrolytes at 40° C. containing 0.5% by mass of calcium chloride and 0.1% by mass of a cation soap (KAO Corp., trade name; "QUARTAMIN 24P"). In this step, sulfuric acid was added to keep the mixture at pH5, and the rubber was co-coagulated with the silicic acid compound to form crumb. Then this crumb was recovered by a filtration, washed twice with water, dried using a hot air blower to obtain a diene-based rubber/inorganic compound complex (A). The composition of this complex is represented by Formulation [I] shown in Table 4.

EXAMPLES 2 TO 5

Similarly to Example 1 except for using each diene-based rubber latex obtained in Reference Production Examples 2 to 5 instead of the diene-based rubber latex (a), diene-based rubber/inorganic compound complexes (B) to (E) were produced. The composition of each complex is represented by Formulation [I] shown in Table 4.

EXAMPLE 6

455 g of the diene-based rubber latex (f) was combined with an emulsion containing 37.5 g of an aromatic oil and then mixed. This mixture was combined with 1200 g of an aqueous solution of a silicate containing 5% by mass, as $SiO_2$, of a silicic acid prepared by diluting JIS #3 Sodium silicate with distilled water. This mixture was then coagulated, washed with water and dried similarly to Example 1 to obtain a diene-based rubber/inorganic compound complex (F-1).

EXAMPLE 7

Similarly to Example 6 except for using 0.05% by mass of a polymer coagulant (Dai-ichi Kogyo Seiyaku Co., Ltd., trade name; "HISET C-200") as a cationic substance instead of the cation soap employed in Example 6, a diene-based rubber/inorganic compound complex (F-2) was obtained.

EXAMPLE 8

JIS #3 Sodium silicate was diluted with distilled water to form an aqueous solution of a silicate containing 5% by mass, as $SiO_2$, of a silicic acid compound, and 1200 g of this aqueous solution was passed through a column packed with a highly acidic cation exchange resin (MUROMACHI KAGAKU KOGYO CO., LTD., trade name; "DOWEX HCR-W2-H"). Then this was combined with a mixture of an emulsion containing 37.5 g of an aromatic oil and 455 g of the diene-based rubber latex (f) to obtain a mixture of the diene-based rubber latex and a silicic acid compound. This mixture was coagulated, washed with water and dried similarly to Example 6 to obtain a diene-based rubber/inorganic compound complex (F-3).

EXAMPLE 9

JIS #3 Sodium silicate was diluted with distilled water to form an aqueous solution of a silicate containing 5% by mass, as $SiO_2$, of a silicic acid compound, and 1200 g of this aqueous solution was made free of cations similarly to Example 8 and then adjusted at pH9 with an aqueous solution of sodium hydroxide. Then the mixture was heated at 90° C. for 2 hours to obtain an aqueous dispersion containing a particle of the silicic acid compound. Subsequently, this dispersion was combined with a mixture of an emulsion containing 37.5 g of an aromatic oil and 455 g of the diene-based rubber latex (f) and mixed. This mixture was coagulated, washed with water and dried similarly to Example 6 to obtain a diene-based rubber/inorganic compound complex (F-4).

The composition of each of complexes F-1 to F-4 in Examples 6 to 9 is represented by Formulation [II] shown in Table 4.

EXAMPLES 10 TO 18

Similarly to Example 7 except for using each of the diene-based rubber latexes obtained in Reference Production Examples 7 to 15 instead of the diene-based rubber latex (f), each of diene-based rubber/inorganic compound complexes (G) to (O) was obtained. The composition of each of these complexes is represented by Formulation [II] shown in Table 4.

EXAMPLES 19 TO 23

Similarly to Example 1 except for using 580 g of an aqueous solution of a silicate containing 5% by mass, as $SiO_2$, of a silicic acid compound prepared by diluting JIS #3 Sodium silicate with distilled water and 333 g of each of the diene-based rubber latexes obtained in Reference Production Examples 16 to 20, each of diene-based rubber/inorganic compound complexes (P) to (T) was obtained. The composition of each of these complexes is represented by Formulation [III] shown in Table 4.

TABLE 4

| Formulation of complex | [I] | [II] | [III] |
| --- | --- | --- | --- |
| Non-oil-extended diene-based rubber A to E | 100 | | |
| Oil-extended diene-based rubber F to O | | 137.5 | |
| Emulsion-polymerized diene-based rubber P to T | | | 70 |
| Silicic acid compound | 40 | 60 | 20 |

Unit: parts by mass

[4] Effect of Certain Cationic Substance in Production of Diene-Based Rubber/Inorganic Compound Complex

EXAMPLE 24

JIS #3 Sodium silicate was diluted with distilled water to form an aqueous solution of a silicate containing 5% by mass, as $SiO_2$, of a silicic acid compound, and 310 g of this aqueous solution was combined with 476 g of the diene-based rubber latex (a). Subsequently, the mixture was added to an aqueous solution of electrolytes at 40° C. containing 0.5% by mass of calcium chloride and 0.1% by mass of a cation soap (KAO Corp., trade name; "QUARTAMIN 24P"). In this step, sulfuric acid was added to keep the mixture at pH5, and the rubber was co-coagulated with the silicic acid compound to form crumb. The whole mass of this crumb underwent a precipitation without undergoing any precipitation of a microparticle of the silicic acid compound separately from the rubber.

After recovering the crumb by a filtration, followed by washing twice with water, drying by a hot air blower, the resultant diene-based rubber/inorganic compound complex was ashed by heating at 640° C. for 8 hours in an electric furnace, which resulted in a 13.2% by mass of ash. From this content of ash, the amount of the silicic acid compound as $SiO_2$ based on 100 parts of the rubber was calculated to be 15.2 parts, which revealed that 98% of the silicic acid compound had been incorporated into the complex upon co-coagulation with the rubber, suggesting that the complex contained almost all of the compound as a filler.

COMPARATIVE 1

JIS #3 Sodium silicate was diluted with distilled water to form an aqueous solution of a silicate containing 5% by mass, as $SiO_2$, of a silicic acid compound, and 310 g of this aqueous solution was combined with 476 g of the diene-based rubber latex (a). Subsequently, the mixture was added to an aqueous solution of an electrolyte at 40° C. containing 0.5% by mass of calcium chloride. In this step, sulfuric acid was added to keep the mixture at pH5, and the rubber was coagulated to form crumb slurry. This crumb slurry, when being allowed to stand, underwent a separation into a microparticulate precipitate composed of a silicic acid compound and floating crumb having a low specific gravity. This crumb was recovered by a filtration, washed twice with water and dried using a hot air blower to obtain a diene-based/inorganic compound complex.

This complex was ashed by heating at 640° C. for 8 hours in an electric furnace, which resulted in a 3.5% by mass of ash. From this content of ash, the amount of the silicic acid compound as SiO2 based on 100 parts of the rubber was calculated to be 3.6 parts, which revealed that 23.2% of the silicic acid compound had been incorporated into the complex. Such findings were due to the fact that most of the rubber and the silicic acid compound are coagulated separately because of the difference in the coagulating rate between the rubber and the silicic acid compound, although a part of the two was co-coagulated. Such separate coagulation was supported also by the appearance after the coagulation.

[5] Preparation of Rubber Compositions and Vulcanized Rubbers and Evaluation of Physical Parameters

EXPERIMENTS 1 TO 23 AND COMPARATIVE EXPERIMENTS 1 TO 3

The diene-based rubber/inorganic compound complexes (A) to (T) and the diene-based rubbers A, F and P were kneaded in accordance with the formulations shown in Table 5 using Labo Plastomill (Toyo Seiki Co., Ltd.,) to obtain the rubber compositions of Experiments 1 to 23 and Comparative Experiment 1 to 3. Subsequently, each rubber composition was vulcanized by a vulcanizing press at 160° C. for 20 minutes to obtain a vulcanized rubber. The Mooney viscosity of each of the rubber compositions of Experiments 1 to 23 and Comparative Experiments 1 to 3, and the physical parameters of each resultant vulcanized rubber were determined. The results are shown in Tables 6 to 8.

TABLE 5

| | Formulation | Example | | | Comparative example | | |
|---|---|---|---|---|---|---|---|
| | | 1 to 5 | 6 to 18 | 19 to 23 | 1 | 2 | 3 |
| Kneading step | | | | | | | |
| 1st step | Complex | (A) to (E) | (F) to (O) | (P) to (T) | | | |
| | | 140 | 197.5 | 90 | | | |
| | Diene-based rubber A | | | | 100 | | |
| | Oil-extended diene-based rubber F | | | | | 137.5 | |
| | Emulsion-polymerized butadiene rubber P | | | | | | 70 |
| | Natural rubber | | | 30 | | | 30 |
| | Carbon black | 10 | 10 | 40 | 10 | 10 | 40 |
| | Silica | | | | 40 | 60 | 20 |
| | Aromatic oil | 10 | | 10 | 10 | | 10 |
| | Silane coupling agent | 5 | 6 | 3 | 5 | 6 | 3 |
| | Stearic acid | 2 | 2 | 2 | 2 | 2 | 2 |
| | Anti aging agent | 1 | 1 | 1 | 1 | 1 | 1 |
| 2nd step | Zinc oxide | 3 | 3 | 3 | 3 | 3 | 3 |
| | Sulfur | 1.5 | 1.5 | 1.5 | 1.5 | 1.5 | 1.5 |
| | Vulcanization accelerator (i) | 1.5 | 1.5 | 1.5 | 1.5 | 1.5 | 1.5 |
| | Vulcanization accelerator (i i) | 1 | 1 | 1 | 1 | 1 | 1 |

Unit: parts by mass

TABLE 6

| | Example | | | | | Comparative |
|---|---|---|---|---|---|---|
| | 1 | 2 | 3 | 4 | 5 | 1 |
| Complex | (A) | (B) | (C) | (D) | (E) | |
| Diene-based rubber | | | | | | A |
| Mooney viscosity of rubber composition | 105 | 110 | 103 | 107 | 100 | 100 |
| Tensile strength index | 116 | 125 | 115 | 120 | 107 | 100 |
| Impact resilience index | 104 | 110 | 123 | 107 | 103 | 100 |
| 3% tan δ (50° C.) index | 107 | 114 | 119 | 110 | 109 | 100 |
| Lambourn wear Index | 113 | 132 | 135 | 128 | 130 | 100 |

Each physical parameter of Experiments 1 to 5 is an index on the basis of the parameter of Comparative Experiment 1 being regarded as 100.

TABLE 7

| | Example | | | | | | |
|---|---|---|---|---|---|---|---|
| | 6 | 7 | 8 | 9 | 10 | 11 | 12 |
| Complex | (F-1) | (F-2) | (F-3) | (F-4) | (G) | (H) | (I) |
| Mooney viscosity of rubber composition | 108 | 102 | 110 | 108 | 105 | 99 | 109 |

TABLE 7-continued

| | | | | | | | |
|---|---|---|---|---|---|---|---|
| Tensile strength index | 92 | 100 | 112 | 116 | 120 | 118 | 127 |
| Impact resilience index | 104 | 106 | 110 | 114 | 105 | 113 | 107 |
| 3% tan δ (50° C.) index | 104 | 104 | 110 | 112 | 109 | 120 | 110 |
| Lambourn wear Index | 110 | 118 | 116 | 108 | 129 | 135 | 125 |

| | Example | | | | | | Comparative |
|---|---|---|---|---|---|---|---|
| | 13 | 14 | 15 | 16 | 17 | 18 | 2 |
| Complex | (J) | (K) | (L) | (M) | (N) | (O) | |
| Diene-based rubber | | | | | | | F |
| Mooney viscosity of rubber composition | 104 | 100 | 103 | 123 | 104 | 97 | 100 |
| Tensile strength index | 125 | 115 | 108 | 94 | 102 | 100 | 100 |
| Impact resilience index | 110 | 104 | 107 | 104 | 112 | 120 | 100 |
| 3% tan δ (50° C.) index | 113 | 102 | 105 | 100 | 115 | 121 | 100 |
| Lambourn wear Index | 130 | 132 | 128 | 115 | 118 | 138 | 100 |

Each physical parameter of Experiments 6 to 18 is an index on the basis of the parameter of Comparative Experiment 2 being regarded as 100.

TABLE 8

| | Example | | | | | Comparative |
|---|---|---|---|---|---|---|
| | 19 | 20 | 21 | 22 | 23 | 3 |
| Complex | (P) | (Q) | (R) | (S) | (T) | |
| Diene-based rubber | | | | | | P |
| Mooney viscosity of rubber composition | 110 | 103 | 104 | 107 | 100 | 100 |
| Tensile strength index | 125 | 140 | 132 | 128 | 120 | 100 |
| Impact resilience index | 112 | 118 | 118 | 125 | 114 | 100 |
| 3% tan δ (50° C.) index | 120 | 123 | 125 | 130 | 118 | 100 |
| Lambourn wear Index | 117 | 135 | 127 | 130 | 132 | 100 |

Each physical parameter of Experiments 19 to 23 is an index on the basis of the parameter of Comparative Experiment 3 being regarded as 100.

In the formulation [I], [II] and [III] shown in Table 5, the following additives were employed.

Carbon black; MITSUBISHI CHEMICAL CORPORATION, trade name: "DIABLACK N 220"

Silica; NIPPON SILICA INDUSTRIAL Co., Ltd., trade name: "Nipsil AQ"

Silane coupling agent; DEGUSSA HULS, trade name: "Si69"

Anti-aging agent; OUCHISHINKO CHEMICAL INDUSTRIAL CO., LTD., trade name: "NOCRAC 810NA"

Vulcanizing promoter (i); OUCHISHINKO CHEMICAL INDUSTRIAL CO., LTD., trade name: "NOCCELER CZ"

Vulcanizing promoter (ii); OUCHISHINKO CHEMICAL INDUSTRIAL CO., LTD., trade name: "NOCCELER D"

According to the results shown in Tables 6 to 8, it was revealed that each of the rubber compositions of Experiments 1 to 23 resulted in a low Mooney viscosity, an excellent processability and satisfactory physical parameters of the vulcanized rubber when compared with the rubber compositions of Comparative Experiments 1 to 3. In addition, a low tanδ at 50° C. and a high repelling elasticity suggest that a tire having a low rolling resistance can be obtained. On the other hand, Comparative Experiments 1 to 3 in each of which the diene-based rubber contained a silica or equivalent similarly to a prior art had a poor wearing resistance which was reflected especially by a low Lambourn wearing resistance.

What is claimed is:

1. A method for producing a diene-based rubber/inorganic compound complex containing a diene-based rubber and a silicic acid compound which comprises:

[1] a step for mixing a diene-based rubber latex (a) and an aqueous solution of a silicate (b) to form a mixture,

[2] a step for mixing said mixture and an aqueous solution of electrolytes containing a cationic substance (c) which has an affinity to said diene-based rubber and also a multivalent metal salt (d) to co-coagulate a diene-based rubber and a silicic acid compound thereby forming an coagulated material, and,

[3] a step for drying said coagulated material.

2. The method for producing a diene-based rubber/inorganic compound complex according to claim 1 wherein said cationic substance (c) is at least one selected from the group consisting of cationic polymers and cationic surfactants.

3. The method for producing a diene-based rubber/inorganic compound complex according to claim 1 wherein said diene-based rubber contained in said diene-based rubber latex (a) is a rubber having heteroatom-containing polar group.

4. The method for producing a diene-based rubber/inorganic compound complex according to claim 1 wherein an extending oil for a rubber is incorporated in said diene-based rubber latex (a).

5. A method for producing a diene-based rubber/inorganic compound complex containing a diene-based rubber and a silicic acid compound which comprises:

[1] a step for mixing a diene-based rubber latex (a), an aqueous solution of a silicate (b) and an aqueous solution of electrolytes containing a cationic substance (c) which has an affinity to said diene-based rubber and also a multivalent metal salt (d) to co-coagulate a diene-based rubber and a silicic acid compound thereby forming an coagulated material, and,

[2] a step for drying said coagulated material.

6. A method for producing a diene-based rubber/inorganic compound complex containing a diene-based rubber and a silicic acid compound which comprises:

[1] a step for mixing a diene-based rubber latex (a) and an aqueous solution of a silicate (b) to form a first mixture,

[2] a step for mixing said first mixture and a first aqueous solution of electrolytes containing a cationic substance (c) which has an affinity to said diene-based rubber but not containing a multivalent metal salt (d) to form a second mixture,

[3] a step for mixing said second mixture and a second aqueous solution of electrolytes containing a multivalent metal salt (d) to co-coagulate a diene-based rubber and a silicic acid compound thereby forming an coagulated material, and,

[4] a step for drying said coagulated material.

7. A method for producing a diene-based rubber/inorganic compound complex containing a diene-based rubber and a silicic acid compound which comprises:

[1] a step for forming an aqueous dispersion by generating silicic acid compound from an aqueous solution of a silicate (b),

[2] a step for mixing a diene-based rubber latex (a) and said aqueous dispersion to form a mixture,

[3] a step for mixing said mixture and an aqueous solution of electrolytes containing a cationic substance (c) which has an affinity to said diene-based rubber and also a multivalent metal salt (d) to co-coagulate a diene-based rubber and a silicic acid compound thereby forming an coagulated material, and,

[4] a step for drying said coagulated material.

8. A rubber composition containing a diene-based rubber/inorganic compound complex produced by the method comprising:

[1] a step for mixing a diene-based rubber latex (a), an aqueous solution of a silicate (b) and an aqueous solution of electrolytes containing a cationic substance (c) which has an affinity to said diene-based rubber and also a multivalent metal salt (d) to co-coagulate a diene-based rubber and a silicic acid compound thereby forming an coagulated material, and,

[2] a step for drying said coagulated material.

9. The rubber composition according to claim 8 comprising at least one selected from the group consisting of a carbon black, a silica and a silane coupling agent.

10. A rubber composition containing a diene-based rubber/inorganic compound complex produced by the method comprising:

[1] a step for mixing a diene-based rubber latex (a) and an aqueous solution of a silicate (b) to form a first mixture,

[2] a step for mixing said first mixture and a first aqueous solution of electrolytes containing a cationic substance (c) which has an affinity to said diene-based rubber but not containing a multivalent metal salt (d) to form a second mixture,

[3] a step for mixing said second mixture and a second aqueous solution of electrolytes containing a multivalent metal salt (d) to co-coagulate a diene-based rubber and a silicic acid compound thereby forming an coagulated material, and,

[4] a step for drying said coagulated material.

11. A rubber composition containing a diene-based rubber/inorganic compound complex produced by the method comprising:

[1] a step for forming an aqueous dispersion by generating silicic acid compound from an aqueous solution of a silicate (b),

[2] a step for mixing a diene-based rubber latex (a) and said aqueous dispersion to form a mixture,

[3] a step for mixing said mixture and an aqueous solution of electrolytes containing a cationic substance (c) which has an affinity to said diene-based rubber and also a multivalent metal salt (d) to co-coagulate a diene-based rubber and a silicic acid compound thereby forming an coagulated material, and,

[4] a step for drying said coagulated material.

12. The rubber composition according to claim 11 comprising a vulcanizing agent.

13. The rubber composition according to claim 12 comprising at least one selected from the group consisting of a carbon black, a silica and a silane coupling agent.

\* \* \* \* \*